(12) United States Patent
Minge et al.

(10) Patent No.: US 8,013,100 B2
(45) Date of Patent: Sep. 6, 2011

(54) SILICONE POLYMERS CROSSLINKABLE VIA METHYLOL GROUPS

(75) Inventors: Oliver Minge, Munich (DE); Peter Ball, Emmerting (DE); Andrea Kneissl, Ottobrunn (DE)

(73) Assignee: Wacker Chemie AG, Munich (DE)

( * ) Notice: Subject to any disclaimer, the term of this patent is extended or adjusted under 35 U.S.C. 154(b) by 302 days.

(21) Appl. No.: 12/300,721

(22) PCT Filed: May 14, 2007

(86) PCT No.: PCT/EP2007/054636
§ 371 (c)(1),
(2), (4) Date: Nov. 13, 2008

(87) PCT Pub. No.: WO2007/131985
PCT Pub. Date: Nov. 22, 2007

(65) Prior Publication Data
US 2009/0149595 A1    Jun. 11, 2009

(30) Foreign Application Priority Data
May 16, 2006 (DE) .......................... 10 2006 022 842

(51) Int. Cl.
C08G 77/26 (2006.01)
C08L 83/08 (2006.01)
(52) U.S. Cl. ........................................ 528/38; 524/588
(58) Field of Classification Search .................. 524/588; 528/38
See application file for complete search history.

(56) References Cited

U.S. PATENT DOCUMENTS

| | | | | |
|---|---|---|---|---|
| 3,259,518 A | * | 7/1966 | Sterman et al. | ................... 442/71 |
| 3,432,536 A | * | 3/1969 | Simoneau | ...................... 556/419 |
| 3,461,100 A | | 8/1969 | Payne et al. | |
| 3,554,952 A | | 1/1971 | Plueddemann | |
| 3,915,917 A | * | 10/1975 | Weiant et al. | ................... 524/430 |
| 4,252,934 A | | 2/1981 | Blount | |
| 4,472,590 A | * | 9/1984 | Mitchell | ......................... 556/418 |
| 4,506,058 A | * | 3/1985 | Ashby et al. | ................... 524/730 |
| 4,559,227 A | * | 12/1985 | Chandra et al. | ................ 510/122 |
| 4,923,946 A | * | 5/1990 | Meddaugh | ........................ 528/18 |
| 5,635,544 A | | 6/1997 | Tamura et al. | |
| 6,022,925 A | * | 2/2000 | Tomko et al. | ................... 524/547 |
| 6,166,093 A | * | 12/2000 | Mougin et al. | ............... 514/772.1 |
| 6,440,429 B1 | * | 8/2002 | Torizuka et al. | ................ 424/401 |
| 2004/0254325 A1 | | 12/2004 | Kuepfer et al. | |
| 2005/0176601 A1 | | 8/2005 | Samain et al. | |

FOREIGN PATENT DOCUMENTS

| | | |
|---|---|---|
| DE | 2002420 A | 7/1970 |
| DE | 10047643 A | 4/2002 |
| EP | 0143175 A | 6/1985 |
| EP | 0342826 A | 11/1989 |
| EP | 0606532 A | 7/1994 |
| EP | 1489129 A | 12/2004 |
| EP | 1544223 A | 6/2005 |
| EP | 1555011 A | 7/2005 |
| WO | 2005010078 A | 2/2005 |

* cited by examiner

Primary Examiner — Robert Loewe
(74) Attorney, Agent, or Firm — Brooks Kushman P.C.

(57) ABSTRACT

Storage stable compounds having at least two organopolysiloxane groups and at least one methylol group are useful as coatings on textile, paper, and other substrates, and are post-crosslinkable.

9 Claims, No Drawings

SILICONE POLYMERS CROSSLINKABLE VIA METHYLOL GROUPS

CROSS-REFERENCE TO RELATED APPLICATION

This application is the U.S. national phase of PCT Appln. No. PCT/EP2007/054636 filed May 14, 2007 which claims priority to German application DE 10 2006 022 842.1 filed May 16, 2006.

BACKGROUND OF THE INVENTION

1. Field of the Invention

The present invention relates to storage-stable post-crosslinkable compounds having at least two organopolysiloxane units and at least one methylol group, and to their preparation and use.

2. Description of the Related Art

Silicones and silicone-containing formulations and composites are known and are widely used in the form of films, coatings and overcoatings for modifying and enhancing a very wide range of materials of construction and fibers. Silicones and silicone-containing formulations have a performance spectrum that makes them in many respects superior to purely organic films, coatings and overcoatings. The use of silicone products thus leads to a substantial improvement in otherwise unobtainable but generally desirable properties such as for example flow behavior, gas permeability, abrasion resistance, hydrophobicity, smoothness, haptics or luster on the part of the treated substrate.

An immense problem with all coatings, but in particular with silicone coatings and their limited chemistry, is the often poor permanence on the particular treated substrate. The consequence of this poor permanence is that the coating is simple to remove mechanically, for example by rubbing or scuffing, or may become detached again from the substrate as a result of chemical stress, for example contact with various solvents and/or exposure to certain pH environments (as occur in washing operations for example).

One approach to solving the problem of poor permanence consists in crosslinking the individual silicone polymer chains with the substrate to be treated as well as with each other, and so increasing the mechanical and chemical resistance and hence permanence of the overall system. The crosslinking between the chains and the bonding to the substrate may be effected not only via noncovalent interactions but also via covalent bonds.

Hydrogen bonds in particular have become established among the noncovalent interactions. Hydrogen bonds, formed for example in the form of urethane or urea groupings within the group of thermoplastic silicone elastomers, combine to ensure an increased network density and also, by interacting with substrate groups which likewise form hydrogen bonds (for example hydroxy units in the case of cellulose surfaces), a certain degree of fixation. The preparation and use of such thermoplastic silicone elastomers is described at length in the publications EP 0 606 532 A1 and EP 0 342 826 A2 among others.

A different noncovalent mechanism of crosslinking involves acid-base interactions between Lewis-basic/Lewis-acidic groups of the silicone polymer with Lewis-acidic/Lewis-basic groups of the substrate or of the polymer. Examples thereof are amino-functional silicone oils which, as will be known, have a positive influence on the hydrophobicity and softness of textiles in particular and, by virtue of their Lewis-basic amino groups, have the property of "going on to" the Lewis-acidic fibers. Such silicone amine oils and also their uses are described in EP 1555011 A for example.

Both mechanisms produce a permanence which is only transient and insufficient, allowing the coating to be easily removed not only mechanically but also chemically.

Appreciably better permanences are achieved when the fixing of polymer and substrate or crosslinking of polymer is effected via the formation of covalent bonds.

Covalent crosslinking can be effected for example by crosslinking the silicone polymers even as they are being prepared, by using trifunctional building blocks for example. However, the polymers thus obtained are thereby adversely affected in their processing properties (for example, melt viscosities, formability, solubility in an application auxiliary). Nor is any fixing to the substrate generally possible any longer. Therefore, subsequent fixing/crosslinking following the performance of an application step is always more sensible.

Such subsequent fixing/crosslinking can be effected for example by the presence of alkoxysilyl groups in the silicone polymer which ensure better permanence through hydrolysis and condensation with hydroxy groups of the substrate or hydroxy groups of other silicone polymers. Such alkoxysilyl-containing silicone polymers are described in EP 1544223 A1 for example. However, the Si—O—C or Si—O-E (E=element of substrate) bonds which form on attachment to the substrate are generally hydrolysis-labile and therefore easy to open again, and therefore permanence in the aqueous environment in particular is generally not good. On the other hand, the formation of comparatively stable siloxane bonds Si—O—Si generally requires a prior treatment of the substrate with appropriate silanes.

Another way of ensuring subsequent covalent crosslinking is to introduce (meth)acrylate groups into the silicone polymer. These groups are known to crosslink and cure on irradiation with UV light. Such photocurable silicone polymers are known and described in U.S. Pat. No. 5,635,544 for example. However, the reaction of methacrylate groups generally ensures only crosslinking between the individual polymer chains and not any fixation to the substrate. Methacrylic functionalization of the substrate, necessary for effective fixing, is costly and inconvenient, however.

N-Methylol crosslinking, already known in the area of the purely organic polymers, is another crosslinking mechanism. It involves the production of polymers bearing N-methylolamide groups by copolymerization with suitable monomers. These N-methylolamide groups are known to bond covalently to alcoholic groups in the absence of water at elevated temperature or, in the presence of acidic catalysts, at lower temperatures. They are similarly capable of reacting with each other and of so effecting a crosslinking of the polymer. Both cases give rise to covalent ether bonds which are known to be very strong and to break only under extreme physical or chemical loads. This effect is utilized for example by EP 0 143 175 A, which uses a free-radical emulsion polymerization to produce polymer dispersions which are post-crosslinkable via the methylol mechanism discussed above. Methylolamide groups can in principle be prepared by reaction of amines with formaldehyde, but the reaction leads in general to polymeric condensation products which via imine intermediates leads to polymeric networks. This reaction of amines with formaldehyde has already been described:

U.S. Pat. No. 3,461,100 describes condensation products of aldehydes and primary di- and monoamines. The resulting highly polymeric condensation products are discussed as protective coatings. DE 10047643 A1 describes polymeric condensation products of aldehydes and silicone amines, but which are exclusively present in highly polymeric and highly crosslinked form.

The product is already highly polymeric in the as-reacted state in both references. The product is accordingly no longer present in a reactive form, such as that represented by the monoaddition product of a formaldehyde molecule onto an amine, and hence is also no longer available for descendent reactions onto substrates or postcrosslinking reactions between product molecules.

SUMMARY OF THE INVENTION

The present invention provides compounds (M) comprising at least two organopolysiloxane units (S) and at least one methylol group of the general formula (1)

$$L^1L^2N\text{-}M1 \tag{1}$$

where

M1 represents an —HCR$^1$—OH radical,

R$^1$ represents hydrogen or an optionally CN- or halogen-substituted C$_1$-C$_{10}$-hydrocarbyl radical, and L$^1$ and L$^2$ represent organic N—C-attached radicals, of which at least L$^1$ comprises at least one organopolysiloxane unit (S), at least one organopolysiloxane unit (S) in L$^1$ being attached via an Si—C bond, the N—C bond in L$^2$ being via an aliphatically saturated carbon atom, and at least 50% of the organopolysiloxane units (S) exclusively having unsubstituted hydrocarbyl radicals and Si—O—Si bonds. i.e. bear only unsubstituted hydrocarbyl radicals or siloxy or polysiloxy units.

The compounds (M) are easily obtainable by reactions of secondary amine group-containing silicones with aldehyde reagents. The compounds (M) are obtainable in pure form and also in the form of organic solutions or aqueous dispersions.

The compounds (M) are stable in storage and are postcrosslinkable via the methylol groups of the general formula (1) and have excellent permanence on many substrates. Many substrates require no pretreatment for this excellent permanence.

The organopolysiloxane unit (S), which is attached via an Si—C bond in L$^1$, may have further organopolysiloxane units (S) attached to it via Si—O—Si bonds. Preferably, at least 5 and in particular at least 10 organo-polysiloxane units (S) are attached via Si—O—Si bonds.

Preferably, R$^1$ represents hydrogen or a substituted or unsubstituted C$_1$-C$_3$-hydrocarbyl radical, in particular hydrogen, methyl or ethyl.

The compounds (M) may preferably have the general formula (2)

$$Q\text{-}(2a,2b)_c\text{-}Q \tag{2}$$

where the units 2a and 2b may be disposed randomly, block-like, alternatingly or in a mixture thereof, the units 2a and 2b conforming to the general formulae (2a) and (2b)

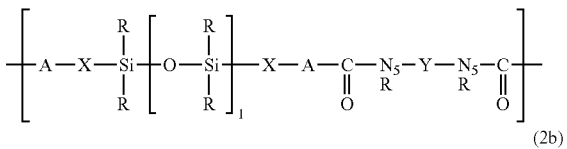

(2a)

(2b)

where l and c represent a whole number of at least 1,

R$^5$ represents M1 or hydrogen subject to the proviso that at least one R$^5$ radical is not hydrogen, R represents hydrogen or a monovalent C$_1$-C$_{20}$-hydro-carbonyl or C$_1$-C$_{20}$-hydrocarbyloxy radical which is optionally substituted with —CN, —NCO, —NR$^2{}_2$, —COOH, —COOR$^2$, —PO(OR$^2$)$_2$, -halogen, -acryloyl, -epoxy, —SH, —OH or —CONR$^2{}_2$ and in each of which one or more mutually nonadjacent methylene units may be replaced by groups —O—, —CO—, —COO—, —OCO—, —OCOO—, —S—, —NR$^2$—, —(CH$_2$CH$_2$O)$_n$— or —(CH$_2$CHCH$_3$O)$_n$— and in each of which one or more mutually nonadjacent methine units may be replaced by groups —N═, —N═N═ or —P═, R$^2$ represents hydrogen or a monovalent optionally NC-, OCN- or halogen-substituted C$_1$-C$_{10}$-hydrocarbyl radical, n represents a whole number from 1 to 1000, X represents an alkylene radical which has 1 to 60 carbon atoms and in which mutually nonadjacent methylene units may be replaced by groups —O— or —S—, A represents an oxygen atom, a sulfur atom or —NR$^5$—, Z represents an oxygen atom, a sulfur atom or —NR$^5$—, Y represents a bivalent optionally fluorine- or chlorine-substituted hydrocarbyl radical which has 1 to 20 carbon atoms and in which the N—C bonds is via aliphatically saturated carbon atoms, D represents an alkylene radical which has 1 to 700 carbon atoms, which is optionally substituted by fluorine, chlorine, C$_1$-C$_6$-alkyl or C$_1$-C$_6$-alkyl ester and in which mutually nonadjacent methylene units may be replaced by groups —O—, —COO—, —OCO— or —OCOO— and which may contain likewise neutralized or free amine, carboxylic acid or sulfonic acid groups, and Q represents a reactive or nonreactive end group attached to the polymer by a covalent bond.

n is preferably a whole number of at least 3, in particular at least 25 and preferably at most 800, in particular at most 400, more preferably at most 250.

l is preferably a whole number of at least 2, in particular at least 5 and preferably at most 200, in particular at most 100, more preferably at most 50.

c is preferably a whole number of at least 2, in particular at least 5 and preferably at most 100, in particular at most 50, more preferably at most 20.

Preferably, R represents a monovalent hydrocarbyl radical of 1 to 6 carbon atoms, in particular nonsubstituted. Particularly preferred R radicals are methyl, ethyl, vinyl and phenyl.

Preferably, R$^2$ represents hydrogen or a monovalent hydrocarbyl radical of 1 to 6 carbon atoms, in particular nonsubstituted.

Preferably, X represents an alkylene radical of 1 to 10 carbon atoms. Preferably, the alkylene radical X has no or not more than one interruption.

Preferably, A represents an NH group, an oxygen atom or a sulfur atom.

Preferably, Z represents an oxygen atom, a sulfur atom or an NH group.

Preferably, Y represents a bivalent hydrocarbyl radical of 3 to 13 carbon atoms which is preferably not substituted. Preferably, Y represents an aralkylene radical or a linear or cyclic alkylene radical.

Preferably, D represents an alkylene radical having at least 2 carbon atoms and at most 12 carbon atoms. Similarly preferably, D represents a polyoxyalkylene radical, in particular a polyoxyethylene radical or polyoxypropylene radical having at least 20, in particular at least 100 carbon atoms and at most 800, in particular at most 200 carbon atoms. Preference is further given to an alkylene radical having at least 2 carbon atoms and at most 12 carbon atoms which is substituted by a neutralized or free carboxylic acid, sulfonic acid or amino group.

The end group Q is preferably hydrogen.

The compounds (M) may preferably have the general formula (3)

$$(SiO_{4/2})_k(R^3SiO_{3/2})_m(R^3{}_2SiO_{2/2})_p(R^3{}_3SiO_{1/2})_q[O_{1/2}SiR^3{}_2—NM^1-X^2—NR^6{}_rR^5{}_{(2-r)}]_s[O_{1/2}H]_t \quad (3)$$

where $X^1$ represents bivalent, optionally substituted aromatic, heteroaromatic or aliphatic radicals $(CR^4{}_2)_b$ in each of which one or more mutually nonadjacent methylene units may be replaced by groups —O—, —CO—, —COO—, —OCO—, —OCOO—, —S—, —NR$^4$—, —(CH$_2$CH$_2$O)$_d$— or —(CH$_2$CHCH$_3$O)$_d$— and in each of which one or more mutually nonadjacent methine units may be replaced by groups —N=, —N=N— or —P=, $X^2$ represents bivalent, optionally substituted aliphatic radicals $(CR^4{}_2)_b$ in each of which one or more mutually nonadjacent methylene units may be replaced by groups —O—, —CO—, —COO—, —OCO—, —OCOO—, —S—, —NR$^4$—, —(CH$_2$CH$_2$O)$_d$— or —(CH$_2$CHCH$_3$O)$_d$—, $R^4$ represents the meanings of $R^2$, b represents a whole number from 1 to 50, d represents a whole number from 1 to 50, $R^3$ and $R^6$ represent the meanings of R, r represents 0, 1 or 2, s represents whole-numbered values of at least 1, t represents 0 or whole-numbered values, and k+m+p+q represents whole-numbered values of at least 2.

The $C_1$-$C_{20}$-hydrocarbyl and $C_1$-$C_{20}$-hydrocarbyloxy radicals $R^3$ and $R^6$ may be aliphatically saturated or unsaturated, aromatic, straight-chain or branched. $R^3$ and $R^6$ have preferably 1 to 12 atoms, in particular 1 to 6 atoms, preferably just carbon atoms, or one alkoxy oxygen atom and otherwise just carbon atoms.

Preferably $R^3$ and $R^6$ are straight-chain or branched $C_1$-$C_6$-alkyl radicals or phenyl radicals. More preferably, the $R^3$ radicals are hydrogen, methyl, ethyl, phenyl and vinyl.

Preferably, $R^6$ and $R^4$ are each a hydrogen atom and $R^3$ is methyl.

b and d are each preferably a whole number of at most 20, in particular at most 6.

s is preferably a whole number of at least 2, at most 50, in particular at most 10.

t is preferably a whole number of at most 50, in particular at most 10.

The polysiloxane of the general formula (3) may be linear, cyclic, branched or crosslinked. The sum total of k, m, p, q, s and t is preferably a whole number of at least 3, in particular 8 and at most 20,000, in particular at most 1000.

Preferably, p/k+m+p+q is at least 0.5, in particular at least 0.9.

The compounds (M) are prepared by reacting the precursor compound of the compound (M), which has at least two organopolysiloxane units (S) and at least one secondary amino group of the general formula (1*)

$$L^1L^2N—H \quad (1*)$$

with an aldehyde reagent of the general formula (4)

$$R^1—COH \quad (4)$$

where $L^1$, $L^2$ and $R^1$ have the above meanings and at least 50% of the organopolysiloxane units (S) exclusively have unsubstituted hydrocarbyl radicals and Si—O—Si bonds.

The silicone polymers of the general formula (2) are advantageously prepared from precursor compounds which in their empirical formula conform to the general formula (2) with the proviso that all $R^5$ radicals represent hydrogen. The preparation of the precursor compound of the silicone polymers of the general formula (2) in which all $R^5$ radicals represent hydrogen is prior art and described in the references EP 1 489 129 A1 for example.

The silicone polymers of the general formula (3) are similarly preferably prepared from corresponding precursor compounds which, in their empirical formula, conform to the general formula (3), with the proviso that all $M^1$ and $R^5$ radicals represent hydrogen.

Such amino-functional silicones as conform in their empirical formula to the general formula (3) where all the $M^1$ and $R^5$ radicals represent hydrogen are known to one skilled in the art and are obtainable with immense variation not only as pure substance but also in ready-produced aqueous formulations. Their preparation, their formulation and their use are described in WO 2005010078 for example.

The compounds (M) are generated in their preparation either as solids, in organic solution or in aqueous dispersion.

To introduce the methylol group M1 into the precursor compounds of the compounds (M), these are treated with one or more aldehyde reagents. Aldehyde reagents include monomeric forms of formaldehyde, for example formaldehyde gas and also aqueous or organic solutions of aldehydes, and also formaldehyde in condensed form, for example in the form of trioxane or other formaldehyde condensates.

The preparation of the compounds (M) with an aldehyde reagent can take place continuously or batchwise not only in dispersion and in solution but also without a solvent. Preferably, the constituents are optimally and homogeneously commixed under the reaction conditions, any phase incompatibility between the reaction components being prevented via solubilizers where appropriate.

Preferred solubilizers are alcohols, such as isopropanol, ethers, such as tetrahydrofuran and dioxane, hydrocarbons, such as toluene, chlorinated hydrocarbons, ketones, such as acetone and methyl ethyl ketone and esters and also and mixtures thereof. Solubilizers having a boiling point or boiling point range of up to 120° C. at 0.1 MPa are preferred.

The reaction can often similarly be performed in aqueous phase when the precursor compound of the compounds (M) is sufficiently dispersible in an aqueous medium. Advantageous solvent systems include mixtures of polar and/or water-miscible organic solvents with water.

Preferably, the precursor compounds of the compounds (M) are dissolved in a suitable formaldehyde-inert solvent and the formaldehyde reagent is subsequently metered in.

Preference is likewise given to a synthesis exclusively in water in which the formaldehyde reagent to be metered is aqueous and the silicone component is present as a dispersion or emulsion in water adjusted to pH between 6 and 9, particularly between 7 and 8, via acids, bases and buffer systems.

Very particular preference is given to the synthesis in a water-soluble solvent or a mixture of water and a water-soluble solvent which is subsequently solvent-exchanged for water to obtain a postcrosslinking aqueous silicone dispersion of the compounds (M). Subsequent emulsification of the compounds (M) is likewise possible.

The compounds (M) are useful in pure form or as a constituent of formulations as coatings, binders and overcoatings for a multiplicity of substrates, in particular fibers of any kind, such as textile fibers, cellulose fibers, cotton fibers and paper fibers, and also polymeric fibers, including but not limited to polyester, polyamide and polyurethane fibers. They are also useful for coating shaped articles and surfaces capable of chemically reacting with methylol functions, for example wood or woodbase materials, and also paper-coated substrates and shaped articles.

The treatment of the above substrates with the compounds (M) endow the treated substrate at its surface with typical silicone properties, for example hydrophobicity, anti-blocking effects or softness.

All the above symbols of the above formulae each have their meanings independently. The silicon atom is tetravalent in all formulae.

Unless stated otherwise, all amounts and percentages are by weight, all pressures are 0.10 MPa (absolute) and all temperatures are 20° C.

EXAMPLES

Example 1a

Preparation of an Organic Solution of a Surface-Active Siloxane-Organo Copolymer (not Inventive)

In a 2000 ml flask equipped with dropping funnel and reflux condenser, a solution of 20.1 g of dimethylol-propionic acid (0.32 mol), 15.2 g of triethylamine (0.32 mol) and 3 drops of dibutyltin dilaurate in 70 ml of acetone was added dropwise to a solution of 44.4 g of isophorone diisocyanate (0.40 mol) in 900 ml of acetone at room temperature. Then, a solution of 129 g of $\alpha,\omega$-bisaminopropylpolydimethylsiloxane (molecular weight 3200 g/mol, 0.08 mol) in 200 ml of acetone was added during 30 minutes and everything was refluxed for 5 hours. The organic solution obtained with a solids content of 20% by weight has virtually unlimited stability at room temperature.

Example 1b

Preparation of an Aqueous Dispersion of a Surface-Active Siloxane-Organo Copolymer (not Inventive)

The acetone solution obtained by following Example 1a is dispersed in 650 ml of water by vigorous stirring (Ultra-Turrax®) and the acetone and some water are removed in a rotary evaporator under reduced pressure. This leaves a polydimethylsiloxane-polyurea-polyurethane dispersion in water, having a solids content of 25% by weight, which was still stable 3 months later.

The surface-active siloxane-organo copolymer is called TPSE for short in the inventive examples which follow.

Example 2a

Preparing a Methylolyl-Containing TPSE 298 g of an acetone solution of TPSE, prepared by following Example 1a, is admixed with 86 g of aqueous formaldehyde solution (36%) at room temperature during 30 minutes with vigorous stirring. On completion of the addition the pH is about 8. Stirring at room temperature is continued for a further 2 hours. Then, 400 mL of water are added and the acetone and also excess formaldehyde are substantially removed under reduced pressure. Finally, 25% ammonia solution is used to adjust the resulting dispersion to pH=8 to obtain a stable, aqueous dispersion of methylolyl-containing TPSE having a solids content of about 20%.

Example 2b

Preparing a Methylolyl-Containing TPSE 100 g of an aqueous dispersion of TPSE, prepared by following Example 1b, is admixed with 30 g of aqueous formaldehyde solution (36%) at room temperature during 30 minutes with vigorous stirring. On completion of the addition the pH is adjusted to about 8. Stirring at room temperature is continued for a further 2 hours and then excess formaldehyde is removed under reduced pressure to obtain a stable, aqueous dispersion of methylolyl-containing TPSE having a solids content of about 27%.

Example 3a 5 g of WACKER Finish CT 34 E (microemulsion of a silicone amine oil from Wacker Chemie AG, Munich, Germany) are dissolved in 10 g of isopropanol and admixed with 20 g of water. Thereafter, the solution is admixed with 1000 µl of aqueous formaldehyde solution (36%) at room temperature with vigorous stirring. On completion of the addition the pH is 5. The solution is adjusted to pH=8 with ammonia solution (25%). The mixture is further stirred at room temperature for 1 hour before excess formaldehyde is removed under slightly reduced pressure.

Example 3b 5 g of Wetsoft® CTA (silicone amine oil from Wacker Chemie AG, Munich, Germany) are dissolved in 10 g of isopropanol and admixed with 20 g of water. Thereafter, the solution is admixed with 1000 µl of aqueous formaldehyde solution (36%) at room temperature with vigorous stirring. On completion of the addition the pH is 4. The solution is adjusted to pH=8 with ammonia solution (25%). The mixture is further stirred at room temperature for 1 hour before excess formaldehyde is removed under slightly reduced pressure.

Example 3c 5 g of Jetsoft® concentrate (silicone amine oil from Wacker Chemie AG, Munich, Germany) are dissolved in 10 g of isopropanol and admixed with 20 g of water. Thereafter, the solution is admixed with 1000 µl of aqueous formaldehyde solution (36%) at room temperature with vigorous stirring. On completion of the addition the pH is 5. The solution is adjusted to pH=8 with ammonia solution (25%). The mixture is further stirred at room temperature for 1 hour before excess formaldehyde is removed under slightly reduced pressure.

Example 3d 5 g of WACKER Finish CT 45 E (macroemulsion of a silicone amine oil from Wacker Chemie AG, Munich, Germany) are admixed with 10 g of isopropanol and 20 g of water. Thereafter, the solution is admixed with 1000 µl of aqueous formaldehyde solution (36%) at room temperature with vigorous stirring. On completion of the addition the pH is 5. The solution is adjusted to pH=8 with ammonia solution (25%). The mixture is further stirred at room temperature for 1 hour before excess formaldehyde is removed under slightly reduced pressure.

Example 3e 5 g of WACKER Finish CT 96 E (microemulsion of a silicone amine oil from Wacker Chemie AG, Munich, Germany) are admixed with 10 g of isopropanol and 20 g of water. Thereafter, the solution is admixed with 1000 µl of aqueous formaldehyde solution (36%) at room temperature with vigorous stirring. On completion of the addition the solution is adjusted to pH=8 with ammonia solution (25%). The mixture is further stirred at room temperature for 1 hour before excess formaldehyde is removed under slightly reduced pressure.

Example 4

Fabric samples composed of cotton fiber are coated with the product solutions of Examples 1 to 3 and also with products which are the same except they do not contain methylol. For drying and crosslinking the fabric samples, they are stored in a drying cabinet for 15 minutes at 130° C. or in the presence of para-toluenesulfonic acid at 60° C. for one hour. The fabric samples are subsequently stored in water, ethanol and hexane at room temperature for 12 hours in each case. The permanence of the coating is tested on the dried fabric samples by weighing.

Softness is determined by hand.

|  | Permanence in water | Permanence in ethanol | Permanence in hexane | Softness |
|---|---|---|---|---|
| Example 1a (V) | -- | -- | - | - |
| Example 1b (V) | -- | -- | - | - |
| Example 2a | ++ | + | ++ | - |
| Example 2b | ++ | + | ++ | - |
| Example 3a | ++ | -- | -- | + |
| Finish CT34E (V) | -- | -- | -- | + |
| Example 3b | ++ | + | + | + |
| Wetsoft ® CTA (V) | - | -- | -- | + |
| Example 3c | ++ | + | - | + |
| Jetsoft ® concentrate (V) | -- | -- | -- | + |
| Example 3d | ++ | ++ | - | + |
| Finish CT45E (V) |  |  |  |  |
| Example 3e | ++ | ++ | ++ | + |
| Finish CT96 (V) |  |  |  |  |

(V): comparative example;
permanence: ++: very good; +: good; -: poor; --: very poor;
softness: + good - poor

What is claimed is:

1. A compound comprising at least two organopolysiloxane units and at least one methylol group of the formula (1)

$$L^1L^2N-M1 \quad (1)$$

where
M1 is an —HCR$^1$—OH radical,
R$^1$ is hydrogen or an optionally NC- or halogen-substituted C$_1$-C$_{10}$-hydrocarbyl radical, and
L$^1$ and L$^2$ are organic N—C-bonded radicals, of which at least L$^1$ comprises at least one organopolysiloxane unit bonded to N via an Si—C bond,
a carbon atom in the N—C bond to L$^2$ being an aliphatically saturated carbon atom, and wherein at least 50% of organopolysiloxane units bear unsubstituted hydrocarbyl radicals or Si—O—Si bonds, having the formula (2)

$$Q-(2a,2b)_c-Q \quad (2)$$

where the units 2a and 2b may be disposed randomly, blocklike, alternatingly or in a mixture thereof, the units 2a and 2b conforming to the formulae (2a) and (2b)

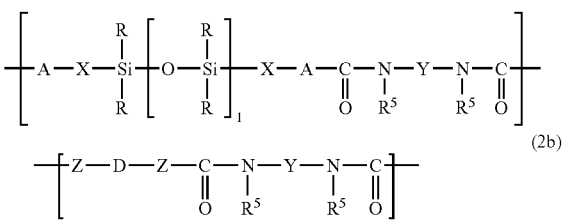

where
1 and c represent a whole number of at least 1,
R$^5$ is M1 or hydrogen, with the proviso that at least one R$^5$ radical is not hydrogen,
R is hydrogen or a monovalent C$_1$-C$_{20}$-hydrocarbyl or C$_1$-C$_{20}$-hydrocarbyloxy radical, each of which is optionally substituted with —CN, —NCO, —NR$^2_2$, —COOH, —COOR$^2$, —PO(OR$^2$)$_2$, -halogen, -acryloyl, -epoxy, —SH, —OH or —CONR$^2_2$, and in each of which one or more nonadjacent methylene units are optionally replaced by a group —O—, —CO—, —COO—, —OCO—, —OCOO—, —S—, —NR$^2$—, —(CH$_2$CH$_2$O)$_n$— or —(CH$_2$CHCH$_3$O)$_n$—, and in each of which one or more nonadjacent methine units are optionally replaced by a group —N═, —N═N— or —P═,
R$^2$ is hydrogen or a monovalent optionally NC—, —OCN— or halogen-substituted C$_1$-C$_{10}$-hydrocarbyl radical,
n is a whole number from 1 to 1000,
X is an alkylene radical which has 1 to 60 carbon atoms and in which nonadjacent methylene units are optionally replaced by a group —O— or —S—,
A is an oxygen atom, a sulfur atom or —NR$^5$—,
Z is an oxygen atom, a sulfur atom or —NR$^5$—,
Y is a bivalent, optionally fluorine- or chlorine-substituted hydrocarbyl radical which has 1 to 20 carbon atoms bonded to N of the NR$^5$ groups in the formulae 2a, 2b by an N—C bond at an aliphatically saturated carbon atom,
D is an alkylene radical which has 1 to 700 carbon atoms, which is optionally substituted by fluorine, chlorine, C$_1$-C$_6$-alkyl or C$_1$-C$_6$-alkyl ester and in which mutually nonadjacent methylene units are optionally replaced by groups —O—, —COO—, —OCO— or —OCOO— and which optionally contains neutralized or free amine, carboxylic acid or sulfonic acid groups, and
Q is a reactive or nonreactive end group attached to the polymer by a covalent bond.

2. A compound of claim 1, wherein each R individually is selected from methyl, ethyl, vinyl and phenyl.

3. A compound of claim 1, wherein the R$^3$ radicals individually are hydrogen, methyl, ethyl, phenyl or vinyl.

4. An aqueous dispersion of a compound of claim 1.

5. A coating, binder, or overcoating for substrates, comprising a compound of claim 1.

6. The coating, binder, or overcoating of claim 5, wherein the substrate is at least one selected from the group consisting of textile fibers and paper fibers.

7. A compound comprising at least two organopolysiloxane units and at least one methylol group of the formula (1)

$$L^1L^2N\text{-}M1 \tag{1}$$

where

M1 is an —HCR$^1$—OH radical,

R$^1$ is hydrogen or an optionally NC— or halogen-substituted C$_1$-C$_{10}$-hydrocarbyl radical, and L$^1$ and L$^2$ are organic N—C-bonded radicals, of which at least L$^1$ comprises at least one organopolysiloxane unit bonded to N via an Si—C bond, a carbon atom in the N—C bond to L$^2$ being an aliphatically saturated carbon atom, and wherein at least 50% of organopolysiloxane units bear unsubstituted hydrocarbyl radicals or Si—O—Si bonds, having the formula (3)

$$(SiO_{4/2})_k(R^3SiO_{3/2})_m(R^3{}_2SiO_{2/2})_p(R^3{}_3SiO_{1/2})_q\text{–}[O_{1/2}SiR^3{}_s\text{—}X^1\text{—}NM^1\text{—}X^2\text{—}NR^6{}_rR^5{}_{(2-r)}]_s[O^{1/2}H]_t \tag{3}$$

where

X$^1$ are bivalent, optionally substituted aromatic, heteroaromatic or aliphatic radicals (CR$^4{}_{2+}$)$_b$ in each of which one or more nonadjacent methylene units are optionally replaced by groups —O—, —CO—, —COO—, —OCO—, —OCOO—, —S—, —NR$^4$—, —(CH$_2$CH$_2$O)$_d$— or —(CH$_2$CHCH$_3$O)$_d$— and in each of which one or more nonadjacent methine units are optionally replaced by groups —N═, —N═N— or —P═, X$^2$ are bivalent, optionally substituted aliphatic radicals (CR$^4{}_2$)$_b$ in each of which one or more nonadjacent methylene units are optionally replaced by groups —O—, —CO—, —COO—, —OCO—, —OCOO—, —S—, —NR$^4$—, —(CH$_2$CH$_2$O)$_d$— or —(CH$_2$CHCH$_3$O)$_d$—, R$^4$ has the meaning of R$^2$, R$^2$ is hydrogen or a monovalent optionally NC—, —OCN— or halogen-substituted C$_1$-C$_{10}$-hydrocarbyl radical, b is a whole number from 1 to 50, d is a whole number from 1 to 50, R$^3$ and R$^6$ have the meaning of R, R is hydrogen or a monovalent C$_1$-C$_{20}$-hydrocarbyl or C$_1$-C$_{20}$-hydrocarbyloxy radical, each of which is optionally substituted with —CN, —NCO, —NR$^2{}_2$, —COOH, —COOR$^2$, —PO(OR$^2$)$_2$, -halogen, -acryloyl, -epoxy, —SH, —OH or —CONR$^2{}_2$, and in each of which one or more nonadjacent methylene units are optionally replaced by a group —O—, —CO—, —COO—, —OCO—, —OCOO—, —S—, —NR$^2$—, —(CH$_2$CH$_2$O)$_n$— or —(CH$_2$CHCH$_3$O)$_n$—, and in each of which one or more nonadjacent methine units are optionally replaced by a group —N═, 13 N═N— or —P═, r is 0, 1 or 2, s is a whole number of at least 1, t is 0 or a whole number, and k+m+p+q is whole number of at least 2.

8. A process for preparing a compound comprising at least two organopolysiloxane units and at least one methylol group of the formula (1)

$$L^1L^2N\text{-}M1 \tag{1}$$

where

M1 is an —HCR$^1$—OH radical,

R$^1$ is hydrogen or an optionally NC— or halogen-substituted C$_1$-C$_{10}$-hydrocarbyl radical, and L$^1$ and L$^2$ are organic N—C-bonded radicals, of which at least L$^1$ comprises at least one organopolysiloxane unit bonded to N via an Si—C bond, a carbon atom in the N-C bond to L$^2$ being an aliphatically saturated carbon atom, and wherein at least 50% of organopolysiloxane units bear unsubstituted hydrocarbyl radicals or Si—O—Si bonds, comprising reacting a precursor compound which has at least two organopolysiloxane units (S) and at least one secondary amino group, of the formula (1*)

$$L^1L^2N\text{—}H \tag{1*}$$

with an aldehyde reagent of the formula (4)

$$R^1\text{—}COH \tag{4}$$

9. The process of claim 8, which is carried out in an aqueous medium.

* * * * *

UNITED STATES PATENT AND TRADEMARK OFFICE
CERTIFICATE OF CORRECTION

| | | |
|---|---|---|
| PATENT NO. | : 8,013,100 B2 | Page 1 of 1 |
| APPLICATION NO. | : 12/300721 | |
| DATED | : September 6, 2011 | |
| INVENTOR(S) | : Oliver Minge | |

It is certified that error appears in the above-identified patent and that said Letters Patent is hereby corrected as shown below:

Column 12, Line 11, Claim 7:

Delete
"replaced by a group -N=, 13 N=N- or -P=,"

and insert

-- replaced by a group -N=, -N=N- or -P=, --

Signed and Sealed this
Third Day of January, 2012

David J. Kappos
*Director of the United States Patent and Trademark Office*